US012367305B2

(12) United States Patent
Krieger et al.

(10) Patent No.: US 12,367,305 B2
(45) Date of Patent: *Jul. 22, 2025

(54) ROW-LEVEL AND COLUMN-LEVEL POLICY SERVICE

(71) Applicant: Palantir Technologies Inc., Palo Alto, CA (US)

(72) Inventors: Brandon Krieger, New York, NY (US); Mark Elliot, London (GB); Matthew Lynch, Brooklyn, NY (US)

(73) Assignee: Palantir Technologies Inc., Denver, CO (US)

( * ) Notice: Subject to any disclaimer, the term of this patent is extended or adjusted under 35 U.S.C. 154(b) by 377 days.

This patent is subject to a terminal disclaimer.

(21) Appl. No.: 17/646,341

(22) Filed: Dec. 29, 2021

(65) Prior Publication Data

US 2022/0121767 A1    Apr. 21, 2022

Related U.S. Application Data

(63) Continuation of application No. 16/005,264, filed on Jun. 11, 2018, now Pat. No. 11,244,063.

(51) Int. Cl.
| | | |
|---|---|---|
| *G06F 21/62* | (2013.01) | |
| *G06F 21/31* | (2013.01) | |
| *G06F 21/60* | (2013.01) | |

(52) U.S. Cl.
CPC .......... *G06F 21/6218* (2013.01); *G06F 21/31* (2013.01); *G06F 21/604* (2013.01)

(58) Field of Classification Search
None
See application file for complete search history.

(56) References Cited

U.S. PATENT DOCUMENTS

| 5,978,475 A | 11/1999 | Schneier et al. |
|---|---|---|
| 6,725,240 B1 | 4/2004 | Asad et al. |

(Continued)

FOREIGN PATENT DOCUMENTS

| CN | 101729531 A | 6/2010 |
|---|---|---|
| CN | 103281301 A | 9/2013 |

(Continued)

OTHER PUBLICATIONS

European Application No. 19179240.7, Extended European Search Report mailed Oct. 17, 2019, 7 pages.

(Continued)

*Primary Examiner* — Olugbenga O Idowu
(74) *Attorney, Agent, or Firm* — Faegre Drinker Biddle & Reath LLP

(57) ABSTRACT

Example embodiments relate to a policy service employed to perform operations to: generate and maintain a data-set that comprises at least a column and a row that intersect at a cell; assign an access policy to a row or column of the data-set, wherein the access policy is defined by one or more access credentials required to receive access the cell that intersect with the row or column; receive a request to read the data-set from a user account, wherein the user account has an associated credential; filter the cell that intersects with the row or column of the data-set based on the access policy and the credential of the user account, in response to receiving the request from the user account; and provide the user account with access to the filtered data-set.

17 Claims, 11 Drawing Sheets

(56) References Cited

U.S. PATENT DOCUMENTS

| | | | |
|---|---|---|---|
| 6,807,569 B1 | 10/2004 | Bhimani et al. | |
| 7,017,046 B2 | 3/2006 | Doyle | |
| 7,069,586 B1 | 6/2006 | Winneg et al. | |
| 7,225,468 B2 | 5/2007 | Waisman et al. | |
| 7,526,435 B1 | 4/2009 | Abe et al. | |
| 7,596,285 B2 | 9/2009 | Brown | |
| 7,770,032 B2 | 8/2010 | Nesta et al. | |
| 7,801,871 B2 | 9/2010 | Gosnell | |
| 7,962,495 B2 | 6/2011 | Jain et al. | |
| 8,141,129 B2 | 3/2012 | Ray et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,158,929 B2 | 10/2015 | Worth | |
| 9,335,897 B2 | 5/2016 | Goldenberg | |
| 9,338,013 B2 | 5/2016 | Castellucci et al. | |
| 9,400,891 B2 | 7/2016 | Stephens | |
| 9,888,039 B2 | 2/2018 | Elliot et al. | |
| 11,315,080 B1* | 4/2022 | Shilovitsky | G06F 16/219 |
| 2002/0112157 A1 | 8/2002 | Doyle et al. | |
| 2003/0018786 A1 | 1/2003 | Lortz | |
| 2003/0065662 A1 | 4/2003 | Cosic | |
| 2003/0188198 A1 | 10/2003 | Holdsworth et al. | |
| 2004/0010607 A1 | 1/2004 | Lee et al. | |
| 2004/0044655 A1 | 3/2004 | Cotner | |
| 2004/0123139 A1 | 6/2004 | Aiello et al. | |
| 2004/0153418 A1 | 8/2004 | Hanweck | |
| 2004/0172634 A1 | 9/2004 | Honda et al. | |
| 2004/0250098 A1 | 12/2004 | Licis | |
| 2004/0250124 A1 | 12/2004 | Chesla | |
| 2005/0157662 A1 | 7/2005 | Bingham et al. | |
| 2005/0165829 A1* | 7/2005 | Varasano | G06Q 30/00 |
| | | | 707/999.102 |
| 2005/0229256 A2 | 10/2005 | Banzhof | |
| 2005/0251865 A1* | 11/2005 | Mont | G06F 21/6245 |
| | | | 726/26 |
| 2005/0262556 A1 | 11/2005 | Waisman et al. | |
| 2005/0275638 A1 | 12/2005 | Kolmykov-zotov et al. | |
| 2006/0031928 A1 | 2/2006 | Conley | |
| 2006/0069912 A1 | 3/2006 | Zheng et al. | |
| 2006/0212931 A1 | 9/2006 | Shull et al. | |
| 2006/0218637 A1 | 9/2006 | Thomas et al. | |
| 2006/0232826 A1 | 10/2006 | Bar-el | |
| 2006/0265747 A1 | 11/2006 | Judge | |
| 2007/0118548 A1* | 5/2007 | Carapella | G06F 16/2428 |
| 2007/0143851 A1 | 6/2007 | Nicodemus et al. | |
| 2007/0271219 A1 | 11/2007 | Agarwal et al. | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2008/0235231 A1 | 9/2008 | Gass | |
| 2009/0103442 A1 | 4/2009 | Douville | |
| 2009/0106442 A1 | 4/2009 | Liu | |
| 2009/0119392 A1 | 5/2009 | Bonjour et al. | |
| 2009/0199273 A1 | 8/2009 | Yalamanchi | |
| 2009/0228701 A1 | 9/2009 | Lin | |
| 2009/0287704 A1 | 11/2009 | Yang | |
| 2009/0328222 A1 | 12/2009 | Helamn et al. | |
| 2010/0077481 A1 | 3/2010 | Polyakov et al. | |
| 2010/0100963 A1 | 4/2010 | Mahaffey | |
| 2010/0235915 A1 | 9/2010 | Memon et al. | |
| 2010/0262625 A1 | 10/2010 | Pittenger | |
| 2010/0262688 A1 | 10/2010 | Hussain et al. | |
| 2010/0330801 A1 | 12/2010 | Rouh | |
| 2011/0023085 A1 | 1/2011 | Inoue | |
| 2011/0029781 A1 | 2/2011 | Clark et al. | |
| 2011/0060910 A1 | 3/2011 | Gormish et al. | |
| 2011/0113471 A1 | 5/2011 | Hjelm et al. | |
| 2011/0202555 A1 | 8/2011 | Cordover et al. | |
| 2011/0219450 A1 | 9/2011 | Mcdougal et al. | |
| 2011/0302180 A1 | 12/2011 | Muller | |
| 2012/0079592 A1 | 3/2012 | Pandrangi | |
| 2012/0084866 A1 | 4/2012 | Stolfo | |
| 2012/0110674 A1 | 5/2012 | Belani et al. | |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0284791 A1 | 11/2012 | Miller et al. | |
| 2012/0330801 A1 | 12/2012 | Mcdougal et al. | |
| 2013/0019306 A1 | 1/2013 | Lagar-Cavilla et al. | |
| 2013/0097709 A1 | 4/2013 | Basavapatna et al. | |
| 2013/0117313 A1* | 5/2013 | Miao | G06F 21/6245 |
| | | | 707/E17.005 |
| 2013/0139268 A1 | 5/2013 | An et al. | |
| 2013/0239217 A1 | 9/2013 | Kindler et al. | |
| 2013/0268668 A1 | 10/2013 | Abuelsaad et al. | |
| 2013/0304616 A1* | 11/2013 | Raleigh | H04M 15/43 |
| | | | 705/34 |
| 2014/0059683 A1 | 2/2014 | Ashley | |
| 2014/0123279 A1 | 5/2014 | Bishop et al. | |
| 2014/0143009 A1 | 5/2014 | Brice et al. | |
| 2014/0173712 A1 | 6/2014 | Ferdinand et al. | |
| 2014/0173738 A1 | 6/2014 | Condry et al. | |
| 2014/0188895 A1 | 7/2014 | Wang et al. | |
| 2014/0229422 A1 | 8/2014 | Jain et al. | |
| 2014/0229844 A1 | 8/2014 | De Armas et al. | |
| 2014/0366132 A1 | 12/2014 | Stiansen et al. | |
| 2015/0020215 A1* | 1/2015 | Worth | G06F 21/6218 |
| | | | 726/28 |
| 2015/0026462 A1* | 1/2015 | Ramesh | G06F 21/6218 |
| | | | 713/165 |
| 2015/0039565 A1 | 2/2015 | Lucas | |
| 2015/0095752 A1 | 4/2015 | Studer | |
| 2015/0128274 A1 | 5/2015 | Giokas | |
| 2015/0188715 A1 | 7/2015 | Castellucci et al. | |
| 2015/0189036 A1 | 7/2015 | He et al. | |
| 2015/0229664 A1 | 8/2015 | Hawthorn et al. | |
| 2015/0248563 A1 | 9/2015 | Alfarano | |
| 2015/0261847 A1 | 9/2015 | Ducott, III et al. | |
| 2015/0326601 A1 | 11/2015 | Grondin et al. | |
| 2016/0004864 A1 | 1/2016 | Falk et al. | |
| 2016/0028759 A1 | 1/2016 | Visbal | |
| 2016/0072842 A1 | 3/2016 | Greenbaum et al. | |
| 2016/0188617 A1 | 6/2016 | Gaikwad | |
| 2016/0224531 A1 | 8/2016 | Robichaud | |
| 2017/0257379 A1 | 9/2017 | Weintraub | |
| 2017/0359379 A1 | 12/2017 | Elliot et al. | |
| 2018/0060603 A1 | 3/2018 | Ahmed | |
| 2018/0096165 A1 | 4/2018 | Warshavsky | |
| 2018/0210936 A1 | 7/2018 | Reynolds | |
| 2018/0262864 A1 | 9/2018 | Reynolds | |
| 2018/0373757 A1 | 12/2018 | Schukovets | |
| 2019/0102425 A1 | 4/2019 | Obeidat | |
| 2020/0320210 A1* | 10/2020 | Gruszecki | G06F 21/6218 |

FOREIGN PATENT DOCUMENTS

| | | |
|---|---|---|
| EP | 1962222 A2 | 8/2008 |
| EP | 2892197 A1 | 7/2015 |
| EP | 2897051 A2 | 7/2015 |
| EP | 2963578 A1 | 1/2016 |
| EP | 2985974 A1 | 2/2016 |
| NL | 2011642 C | 8/2015 |
| WO | WO-2005010685 A2 | 2/2005 |

OTHER PUBLICATIONS

"About Virus Total", [Online]. Retrieved from the Internet: <http://www.virustotal.com/about.html>, (Jun. 30, 2014), 8 pgs.

(56) References Cited

OTHER PUBLICATIONS

"U.S. Appl. No. 14/033,076, Notice of Allowance mailed Mar. 11, 2016", 17 pgs.
"U.S. Appl. No. 14/223,918, Non Final Office Action mailed Jun. 8, 2015", 14 pgs.
"U.S. Appl. No. 14/223,918, Notice of Allowance mailed Jan. 6, 2016", 12 pgs.
"U.S. Appl. No. 14/280,490, First Action Interview Pre-Interview Communication mailed Jul. 24, 2014", 14 pgs.
"U.S. Appl. No. 14/473,860, Notice of Allowance mailed Jan. 5, 2015", 13 pgs.
"U.S. Appl. No. 14/479,863, First Action Interview Pre-Interview Communication mailed Dec. 26, 2014", 5 pgs.
"U.S. Appl. No. 14/490,612, Examiner Interview Summary mailed Mar. 31, 2015", 7 pgs.
"U.S. Appl. No. 14/490,612, First Action Interview Pre-Interview Communication mailed Jan. 27, 2015", 16 pgs.
"U.S. Appl. No. 14/731,312, First Action Interview Pre-Interview Communication mailed Apr. 14, 2016", 14 pgs.
"U.S. Appl. No. 14/816,748, First Action Interview Pre-Interview Communication mailed Apr. 1, 2016", 5 pgs.
"U.S. Appl. No. 14/816,748, First Action Interview Pre-Interview Communication mailed May 24, 2016", 8 pgs.
"U.S. Appl. No. 14/823,935, First Action Interview Pre-Interview Communication mailed Dec. 4, 2015", 9 pgs.
"U.S. Appl. No. 14/823,935, Notice of Allowance mailed Apr. 25, 2016", 5 pgs.
"U.S. Appl. No. 14/923,712, Non Final Office Action mailed Feb. 12, 2016", 18 pgs.
"U.S. Appl. No. 14/970,317, First Action Interview Pre-Interview Communication mailed Mar. 21, 2016", 9 pgs.
"U.S. Appl. No. 14/970,317, Notice of Allowance mailed May 26, 2016", 6 pgs.
"U.S. Appl. No. 14/982,699, First Action Interview Pre-Interview Communication mailed Mar. 25, 2016", 9 pgs.
"U.S. Appl. No. 15/204,866, Final Office Action mailed Jun. 28, 2017", 11 pgs.
"U.S. Appl. No. 15/204,866, First Action Interview—Pre-Interview Communication mailed Oct. 17, 2016".
"U.S. Appl. No. 15/204,866, Notice of Allowance mailed Sep. 20, 2017", 13 pgs.
"U.S. Appl. No. 15/807,180, First Action Interview—Pre-Interview Communication mailed Aug. 1, 2018".
"European Application Serial No. 14199180.2, Extended European Search Report mailed Aug. 31, 2015", 16 pgs.
"European Application Serial No. 14199180.2, Parial European Search Report mailed Jun. 22, 2015", 6 pgs.
"European Application Serial No. 15175106.2, Extended European Search Report Nov. 5, 2015", 8 pgs.
"European Application Serial No. 15180985.2, Extended European Search Report mailed Jan. 15, 2016", 9 pgs.
"FireEye", Advanced Persistent Threat (APT) Attack & Zero-Day Protection I FireEye Malware Protection System, (accessed Jun. 30, 2014), 2 pgs.
"FireEye Products and Solutions Overview", [Online]. Retrieved from the Internet: <URL: http://www.fireeye.comproducts-and-solutions/, (Accessed Jun. 30, 2014), 2 pgs.
Baker, David W., et al., "The Development of a Common Enumeration of Vulnerabilities and Exposures", Presented at the Second International Workshop on Recent Advances in Intrusion Detection, (Sep. 1999), 1-35.
Bhuyan, Monowar H., et al., "Network Anomaly Detection: Methods, Systems and Tools", IEEE Coivimunications Surveys & Tutorials, vol. 16. No. 1, (2014), 303-336.
Crosby, Scott A., et al., "Efficient Data Structures for Tamper-Evident Logging", Department of Computer Science, Rice University, (2009), 17 pgs.
Glaab, Enrico, et al., "EnrichNet: network-based gene set enrichment analysis", Bioinformatics 28.18, (2012), 1451-1457.
Hur, Junguk, et al., "SciMiner: web-based literature mining tool for target identification and functional enrichment analysis", Bioinformatics 25.6, (2009), 838-840.
Lee, Wenke, et al., "A Data Mining and CIDF Based Approach for Detecting Novel and Distributed Intrusions", Recent Advances in Intrusion Detection: Lecture Notes in Computer Science, vol. 1907, (Nov. 11, 2000), pp. 49-65.
Ma, Di, et al., "A New Approach to Secure Logging", ACM Transactions on Storage; vol. 5, No. 1, Article 2,, (Mar. 2009), 1-21.
Schneier, Bruce, et al., "Automatic event-stream notarization using digital signatures", Security Protocols; vol. 1189 of the series Lecture Notes in Computer Science, (Jun. 3, 2005), 155-169.
Schneier, Bruce, et al., "Cryptographic Support for Secure Logs on Untrusted Machines", The 7th USENIX Security Symposium Proceedings; USENIX Press, (Jan. 1998), 53-62.
Waters, Brent R, et al., "Building an Encrypted and Searchable Audit Log", Palo Alto Research Center, (Jan. 9, 2004), 11 pgs.
Zheng, Qi, et al., "GOEAST: a web-based software toolkit for Gene Ontology enrichment analysis", Nucleic Acids Research, 2008, vol. 36, Web Server issue, (May 16, 2008), W358-W63.

\* cited by examiner

500

```
ASSIGN A SECOND CREDENTIAL TO A USER
ACCOUNT
510
```
↓
```
ADD THE SECOND CREDENTIAL TO THE USER
ACCOUNT OF THE USER RESPONSIVE TO
ASSIGNING THE SECOND CREDENTIAL TO THE
USER ACCOUNT
520
```

*FIG. 5*

ROW-LEVEL AND COLUMN-LEVEL POLICY SERVICE

PRIORITY APPLICATION

This application claims priority to U.S. patent application Ser. No. 16/005,264, filed Jun. 11, 2018, the disclosure of which is incorporated by reference herein in its entirety.

TECHNICAL FIELD

The subject matter disclosed herein generally relates to security and more specifically to systems and methods for enhancing database security.

BACKGROUND

Organizations frequently employ large database systems for storing information to which a large number of users may require access. In general, a typical database is an organized collection of information structured such that users may quickly search for and access data. Records within a database are indexed as rows within a table and the record fields are commonly indexed as columns, such that a row/column pair can reference specific contents within the database.

The data stored within the database often includes personal or sensitive information that may require special user credentials to view or access. As a result, some databases often require different permissions levels for access. Often entire database tables have access to their information restricted based on identifiers of certain users or based on certain roles/attributes that users assume when they are authenticated to the database.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 5 is a flowchart illustrating a method for adding a credential to a data-set associated with a client device, according to some example embodiments.

DETAILED DESCRIPTION

Figure 1:
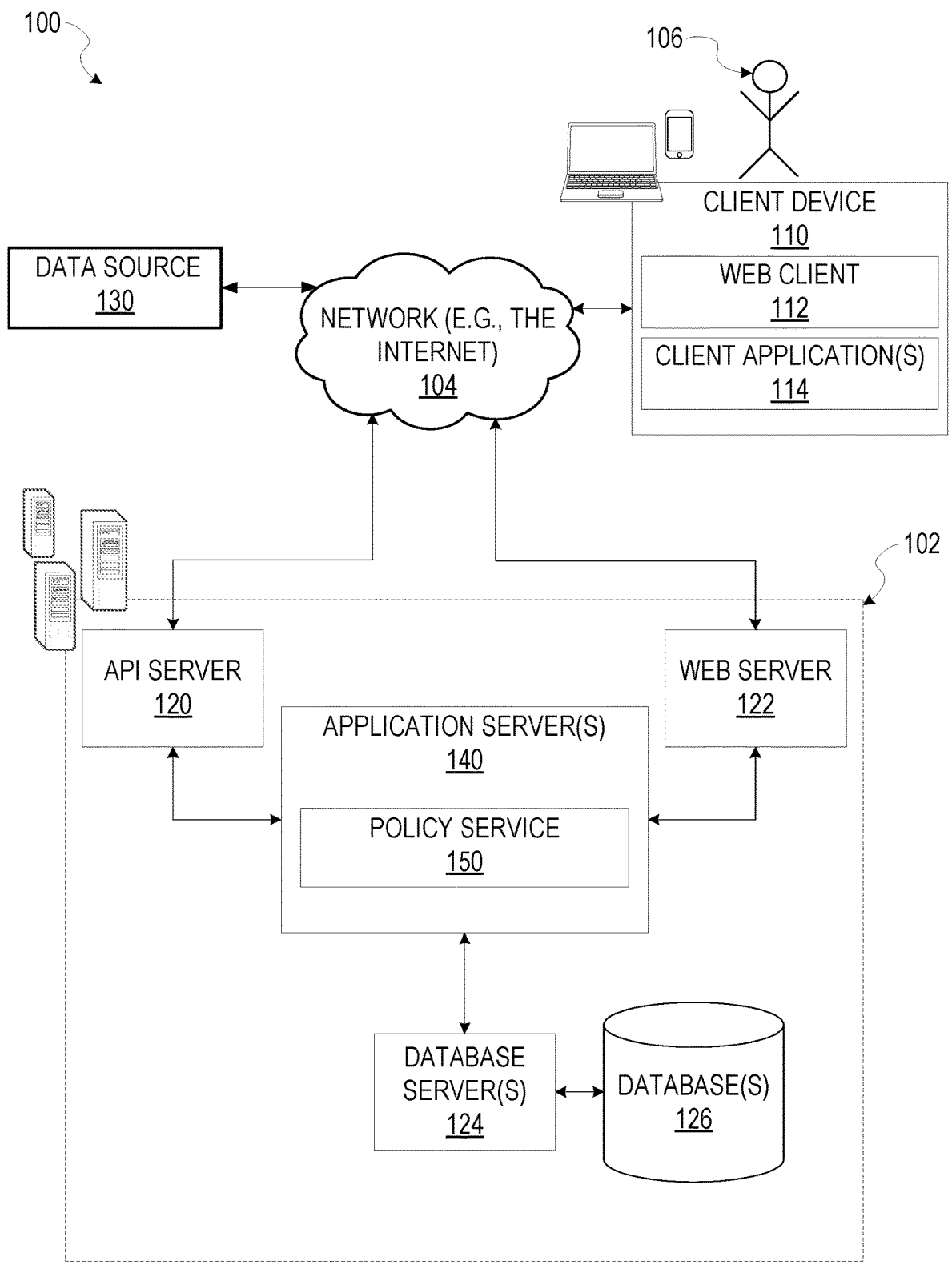
FIG. 1 is a network diagram depicting a networked system comprising a group of application servers that include a policy service configured for providing access to a database, consistent with some embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a policy service, employed to perform operations to generate and maintain a data-set that comprises at least a column and a row that intersect at a cell; assign an access policy to the row or column of the data-set, wherein the access policy defines at least an access credential required to receive access one or more cells that are within the same row or column; receive a request to read the data-set from a user, wherein the user has an associated credential; filter the cells that intersect with the row of the data-set based on the access policy and the credential of the user, in response to receiving the request from the user; and provide the user with access to read the filtered data-set.

The access policy assigned to the row or column may include a set of one or more credentials required to access contents of the row or column, wherein the credentials may include user attributes (e.g., title, clearance level, rank, etc.), device attributes (e.g., device type), location criteria, as well as temporal criteria. For example, the access policy may comprise a set of credentials that restrict access to contents of a row or column of a data-set, to devices located at a particular location or to users with a threshold security clearance level. In some embodiments, the access policy defines access criteria to the row or column of the data-set, based on one or more predefined credentials. For example, the access credentials may define whether or not a particular user or group of users can read a row or column of a data-set, write to a data-set, edit a data-set, or any combination thereof.

In some embodiments, the policy service curates and presents a data-set to a user, based on one or more credentials of the user. For example, a set of access policies may be associated with each row or column of a data-set, wherein the access policies define access credentials required to receive access to contents of corresponding rows or columns. Upon receiving a request to access the data-set from a user, the policy service curates and presents a filtered data-set to the user based on considerations that include credentials of the user and the access policies corresponding to each row or column of the data-set. In some embodiments, the credentials of the user are stored within a memory location associated with the user, locally at the policy service, thus enabling the policy service to quickly and efficiently determine access privileges of a particular user based on an associated user identifier or other request attributes of the request to access the data-set.

For example, in response to receiving a request from a user to access a data-set, the policy service retrieves the credentials of the user from the memory location associated with the user, based on an identifier of the user, such as a user identifier, or a device identifier. The policy service filters the data-set based on a comparison of one or more access policies that correspond to the rows and columns of the data-set, and the credentials of the user. In some embodiments, the credentials of the user are maintained and updated in real-time, such that as new credentials and privileges are granted to the user (e.g., the user changes positions within the same organization), the policy service may quickly update the credentials of the user at the memory location associated with the user, by adding (or removing) the relevant privileges and credentials.

A user may request to write data to the data-set (e.g., a new row or column). In response to receiving a request to write to the data-set from a user, the policy service assigns a set of access policies to the new row or column. In some embodiments, the policy service retrieves access credentials associated with the user that created the new row or column, and assigns the credentials of the user to the new row or column. In further embodiments, in response to receiving the request to write to the data-set, the policy service causes display of a notification at a device associated with an administrator of the data-set, wherein the notification includes a request for the administrator to assign a set of policies to the new data. The administrator of the data-set may thereby provide inputs specifying the policies and credentials necessary for access to the contents of the newly added row or column. For example, the policy service may maintain a registry of predefined access policies, wherein the administrator may select or otherwise identify one or more of the access policies based on a policy identifier.

In some embodiments, a user may wish to generate a new data-set based on an existing data-set. For example, the new data-set may comprise an aggregation of values retrieved from the data-set. In response to generating the new data-set based on the values retrieved from the data-set, the policy service identifies access policies from the rows and columns of the existing data-set, and assigns the access policies to the rows and columns of the new data-set.

Consider an illustrative example from a user perspective. An administrator of the policy service generates a data-set that comprises a set of columns and a set of rows. The policy service generates and causes display of a graphical user interface (GUI) at a device of the administrator, wherein the GUI includes a display of a set of policy identifiers of predefined access policies which may be assigned to any of the rows or columns of the data-set. The administrator selects one or more access policies from among the predefined access policies, and provides an input that assigns the one or more access policies to one or more of the rows or columns of the data-set. Cells that intersect with a particular row or column thereby receive the access policies of the corresponding row or column.

A user wishing to access data within the data-set transmits an access request (e.g., read or write) to the policy service, wherein the request includes an identification of one or more cells (or rows or columns) of the data-set. In response to receiving the access request, the policy service retrieves credentials associated with the user, wherein the credentials comprise privileges assigned to the user, a security clearance assigned to the user, as well as user attributes, and/or devices attributes associated with the user. The policy service filters the data-set based on the credentials of the user, and provides the user access to the filtered data-set. In some embodiments, the policy service may generate and cause display of a presentation of the filtered data-set at the device of the user, wherein the presentation of the filtered data-set comprises a redacted view of some of the contents of the rows and columns of the data-set.

In some embodiments, the policy service may also generate and display an indication that data has been filtered out of the data-set within the presentation of the data-set, wherein the indication includes an identification of the credentials necessary to view or otherwise access the contents of a row, column, or cell.

Thus, by assigning the access policies to the rows of the data-set, the policy service may more quickly and efficiently filter a data-set based on access credentials of a user, without the need of generating a distinct data-set for distinct user groups (based on access credentials).

FIG. 1 is a network diagram illustrating a network environment 100 suitable for operating a policy service 150. A networked system 102 provides server-side functionality, via a network 104 (e.g., an intranet, the Internet or a Wide Area Network (WAN)), to one or more clients such as client device 110, and data source 130. FIG. 1 illustrates a web client 112, client applications 114 executing on the client device 110.

An Application Program Interface (API) server 120 and a web server 122 are coupled to, and provide programmatic and web interfaces respectively to, one or more application servers 140. The application servers 140 host the policy service 150. The application servers 140 are, in turn, shown to be coupled to one or more database servers 124 that facilitate access to one or more databases 126.

The policy service 150 provides functionality to assign a set of policies to a row or column of a data-set, receive a request to access contents of the data-set from a user, retrieve credentials associated with the user in response to receiving the request to access contents of the data-set from the user, filter the data-set based on the credentials of the user and the set of policies assigned to each row or column of the data-set, and to generate a presentation of the filtered data-set at a device of the user through a networked system 102, according to certain example embodiments.

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the networked system 100 to exchange data with the networked system 102 over the network 104.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more GUIs. The GUIs may be specifically associated with the web client 112 (e.g., a browser) or the client application 114, executing on the client device 110, and in communication with the networked system 102.

Figure 2:
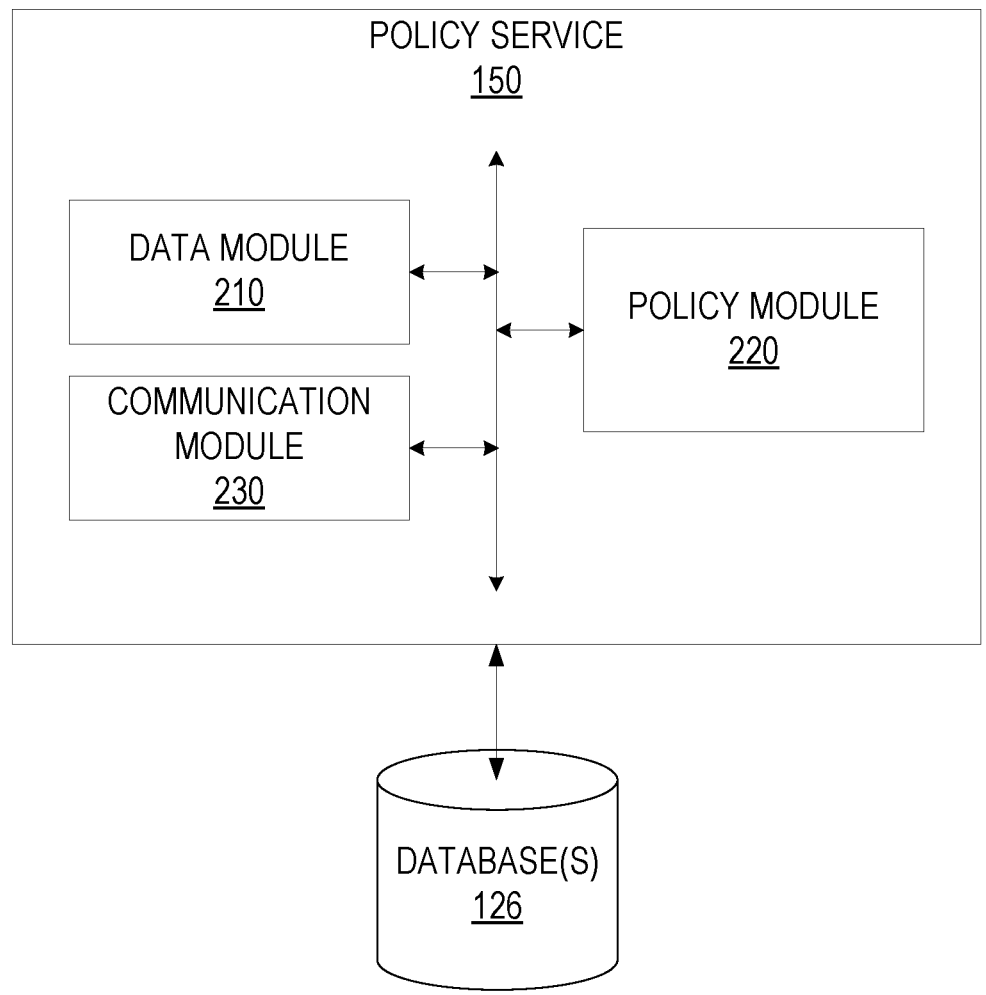
FIG. 2 is a block diagram illustrating various components of the policy service, which is provided as part of the networked system, consistent with some embodiments.

FIG. 2 is a block diagram illustrating an exemplary embodiment of the various components of the policy service 150, which is provided as part of the networked system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the policy service 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the policy service 150 may be combined into a single module, or subdivided among multiple modules. It shall be appreciated that while the functional components (e.g., modules) of FIG. 2 are discussed in the singular sense, in other embodiments, multiple instances of one or more of the modules may be employed.

The policy service 150 is shown as including a data module 210, a policy module 220, and a communication module 230, all configured to communicate with each other (e.g., via a bus, shared memory, a switch, or application programming interfaces (APIs)).

The data-set module 210 is configured to generate and manage a data-set based on credentials of users associated with one or more client devices 110, or a data source 130. For example, the data module 210 may generate a data-set that comprises one or more columns and rows that contain content, wherein access to the content within the columns and rows of the data-set is governed by access policies assigned to the columns and rows of the data-set.

The policy module 220 is configured to manage and assign access policies to one or more columns and rows of the data-set generated by the data module 210.

The communication module 230 is configured to facilitate communication between the data source 130, the client device 110, and the network 104.

As seen in FIG. 2, the policy service 150 may be in communication with the databases 126 (e.g., via the database server 124). For example, the policy service 150 may store data necessary to perform the one or more actions of the policy service 150 within the databases 126.

Figure 3:
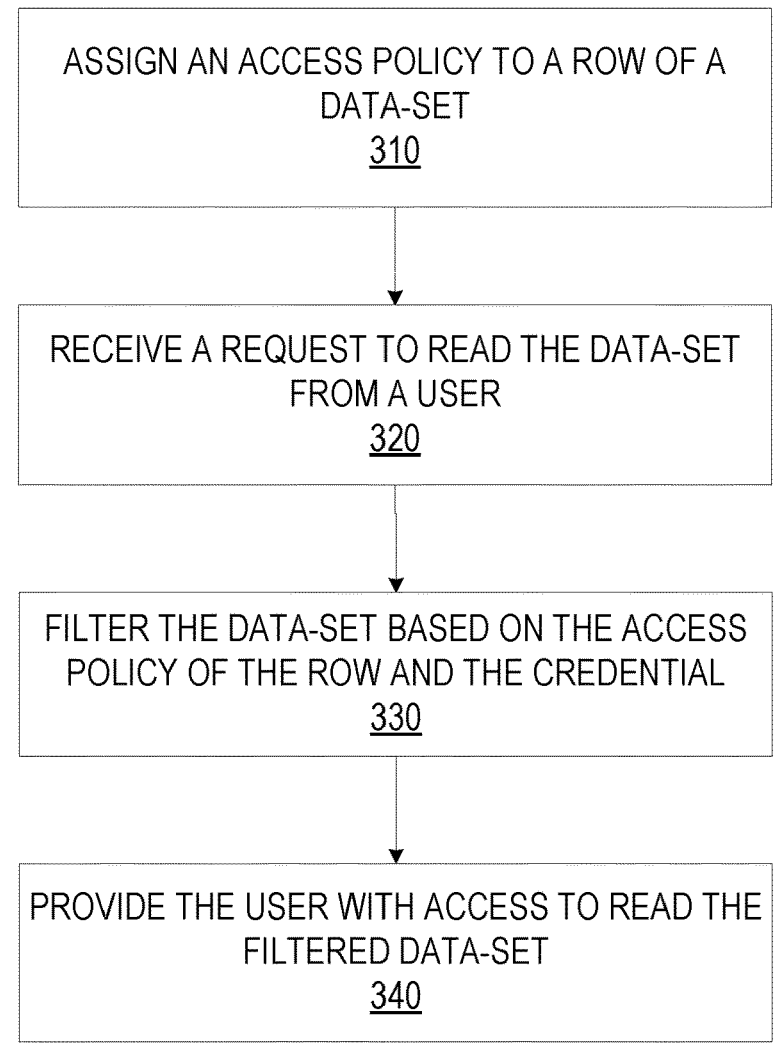
FIG. 3 is a flowchart illustrating a method for providing a client device with access to a data-set, according to some example embodiments.

FIG. 3 is a flowchart illustrating a method 300 for providing a user of a client device (e.g., client device 110) with access to all or a portion of a data-set, according to some example embodiments. The method 300 is embodied in computer-readable instructions for execution by one or more processors such that the operations of the method 300 are performed in part or in whole by the network-based policy service 150; accordingly, the method 300 is described below by way of example with reference thereto. However, it shall be appreciated that at least some of the operations of the method 300 may be deployed on various other hardware configurations, and the method 300 is not intended to be limited to the network-based policy service 150.

At operation 320, the policy module 220 assign at least one access policy to a row (and/or column) of a data-set, wherein the access policy comprises an identification of one or more credentials or criteria necessary to receive access to contents of cells that intersect with the row or column. For example, the access policy may require that a user requesting access to contents of a corresponding row or column must satisfy certain conditions to receive access to the contents of the corresponding row or column, such as a specific user credential, geographic criteria (e.g., only users at a predefined location), as well as temporal criteria (e.g., the content is only available at a certain time, or for a certain period of time).

In some embodiments, an administrator of the policy service 150 may pre-configure the policy module 220 with a set of rules, wherein the rules define what policies should be assigned to what rows or cells based on a number of attributes or conditions. The policy module 220 may maintain a registry of predefined access policies, wherein the access policies may themselves be associated with attributes and conditions of a data-set. For example, data-sets created at a certain time may automatically receive a first corresponding access policy, or data-sets that contain a certain data type may automatically receive a second corresponding access policy. In further embodiments, a user or administrator may provide an explicit input into the policy service 150 through the policy module 220, selecting one or more access policies from an access policy registry to assign to one or more rows or columns of a data-set.

At operation 330, the communication module 230 receives a request to read the data-set from a user 106 of a client device (e.g., client device 110), wherein the request includes a user identifier of the user, and in some embodiments the credentials of the user 106. For example, the user 106 may transmit a query to the application servers 140, wherein the query includes a request to read contents of the data-set. The credentials of the user may include user attributes, device attributes, as well as geographic data and temporal data.

At operation 340, in response to receiving the request to read the data-set from the client device 110, the policy module 220 filters the data-set based on the credentials of the user 106 and the access policy assigned to the rows and columns of the data-set. As discussed above, the access policies assigned to the rows and columns of the data-set define the credentials required to access the contents of the rows and columns.

At operation 350, the communication module 230 provides a user account of the user 106 with access to read the filtered data-set at the client device 110. For example, the communication module 230 may generate and cause display of the filtered data-set at the client device 110, wherein data from cells that intersect the rows or columns of the data-set are filtered from the presentation based on the credentials of the requesting user (the user 106) and the access policies assigned to the corresponding rows or columns. In some embodiments, the communication module 230 may include an indication that data has been filtered from the data-set. For example, the presentation of the data-set may include a notification that data has been filtered from the presentation of the data-set.

Figure 4:
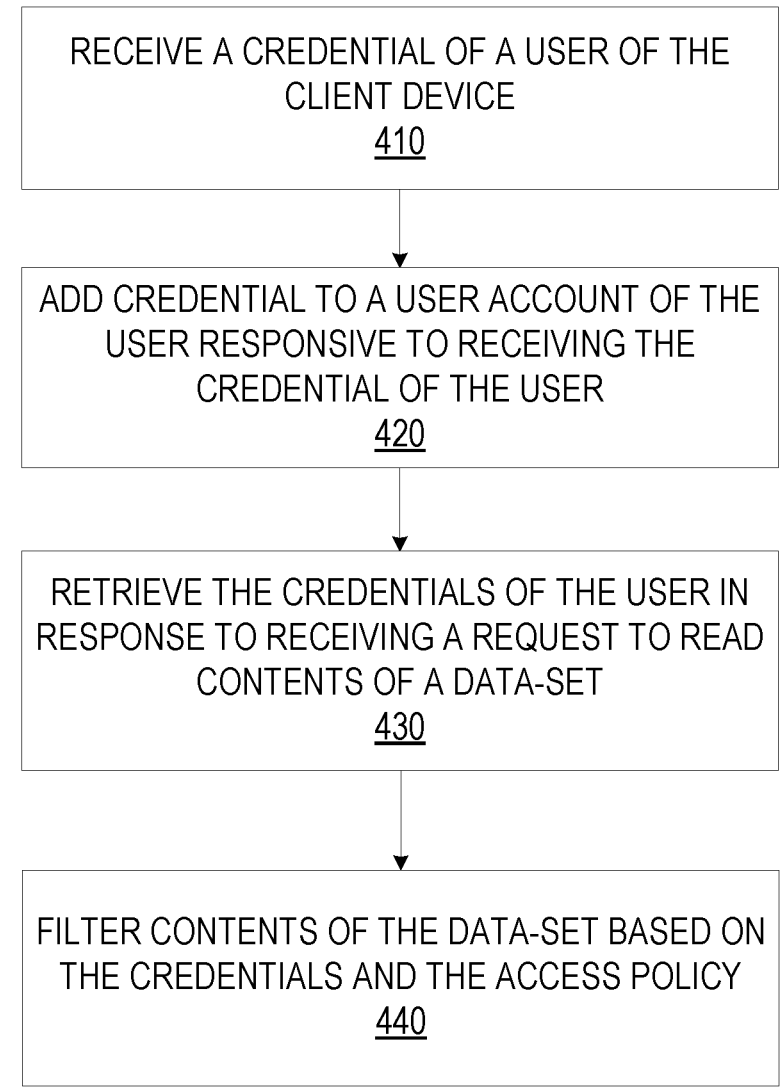
FIG. 4 is a flowchart illustrating a method for filtering contents from a data-set, according to some example embodiments.

FIG. 4 is a flowchart illustrating a method 400 for filtering contents of a data-set, according to some example embodiments. The method 400 is embodied in computer-readable instructions for execution by one or more processors such that the operations of the method 400 are performed in part or in whole by the network-based policy service 150; accordingly, the method 400 is described below by way of example with reference thereto. However, it shall be appreciated that at least some of the operations of the method 400 may be deployed on various other hardware configurations, and the method 400 is not intended to be limited to the network-based policy service 150. One or more operations of the method 400 may be performed as part (e.g., a precursor task, a subroutine, or a portion) of the method 300 of FIG. 3, according to some example embodiments.

At operation 410, the data module 210 updates credentials associated with a user account at a memory location associated with a user of a client device 110. For example, a user account associated with a user 106 may receive certain access privileges, or security clearance, or credentials from an administrator of the policy service 150.

At operation 420, in response to receiving the credentials of the user account, at operation 420 the data module 210 updates a memory location associated with the user 106 by adding the credentials to the user account. In some embodiments, the credentials may be indexed and stored locally at the policy service 150, such that the credentials associated with the user 106 and the client device 110 are immediately available to the various modules of the policy service 150. In some embodiments, the credentials are indexed and stored at a memory location within the client device 110, such that requests to access contents of a data-set transmitted from the client device 110 may include at least a portion of the credentials of the user 106. In further embodiments, the credentials may be associated with a user account of the user 106, such that logging into the user account of the user 106, the credentials may be retrieved and stored at a temporary memory location of the client device 110, for as long as the user 106 is logged into the user account, then purged from the client device 110 when the user logs off of the client device 110.

At operation 430, the data module 210 retrieves the credentials associated with the user 106 in response to receiving the request to read contents of a data-set from the client device 110. In embodiments where the credentials of the user are stored locally to the policy service 150, the data module 210 retrieves the credentials associated with the user 106 and based on a device or user identifier of the user 106 (or the client device 110). In embodiments where the credentials are stored at a memory location of the client device 110, the data module 210 may transmit a request for the credentials of the user to the client device 110, and receive the credentials in a response to the request.

At operation 440, the policy module 220 filters contents of the data-set based on the access policy assigned to the rows and columns of the data-set, and the credentials of the requesting user (e.g., the user 106).

FIG. 5 is a flowchart illustrating a method 500 for adding a credentials to a user account of a user 106, according to some example embodiments. One or more operations of the method 500 may be performed as part (e.g., a precursor task, a subroutine, or a portion) of operation 420 of the method 400 of FIG. 4, according to some example embodiments.

At operation 510, the policy module 220 receives a request to add a credential to a user account associated with the user 106 of the client device 110. The request may include an identification of the user 106 based on a user identifier, a group identifier which the user 106 is a member of, a location identifier associated with the user 106 (e.g., all users in New York receive a new credential), or a device identifier that identifies a device or device type associated with the user 106.

At operation 520, in response to receiving the request that identifies the user 106 and the client device 110, the policy module 220 identifies a memory location associated with the user based on at least a user identifier of the user 106, and adds the new credential to the memory location associated with the user 106.

In some embodiments, in response to receiving the request to add the credential to the user account of the user 106, the policy module 220 adds the new credential to a queue, and only updates the credentials of the user 106 in response to receiving an indication that the user 106 has logged into their account, or in response to receiving a request to access contents of a data-set from the user 106.

Figure 6:
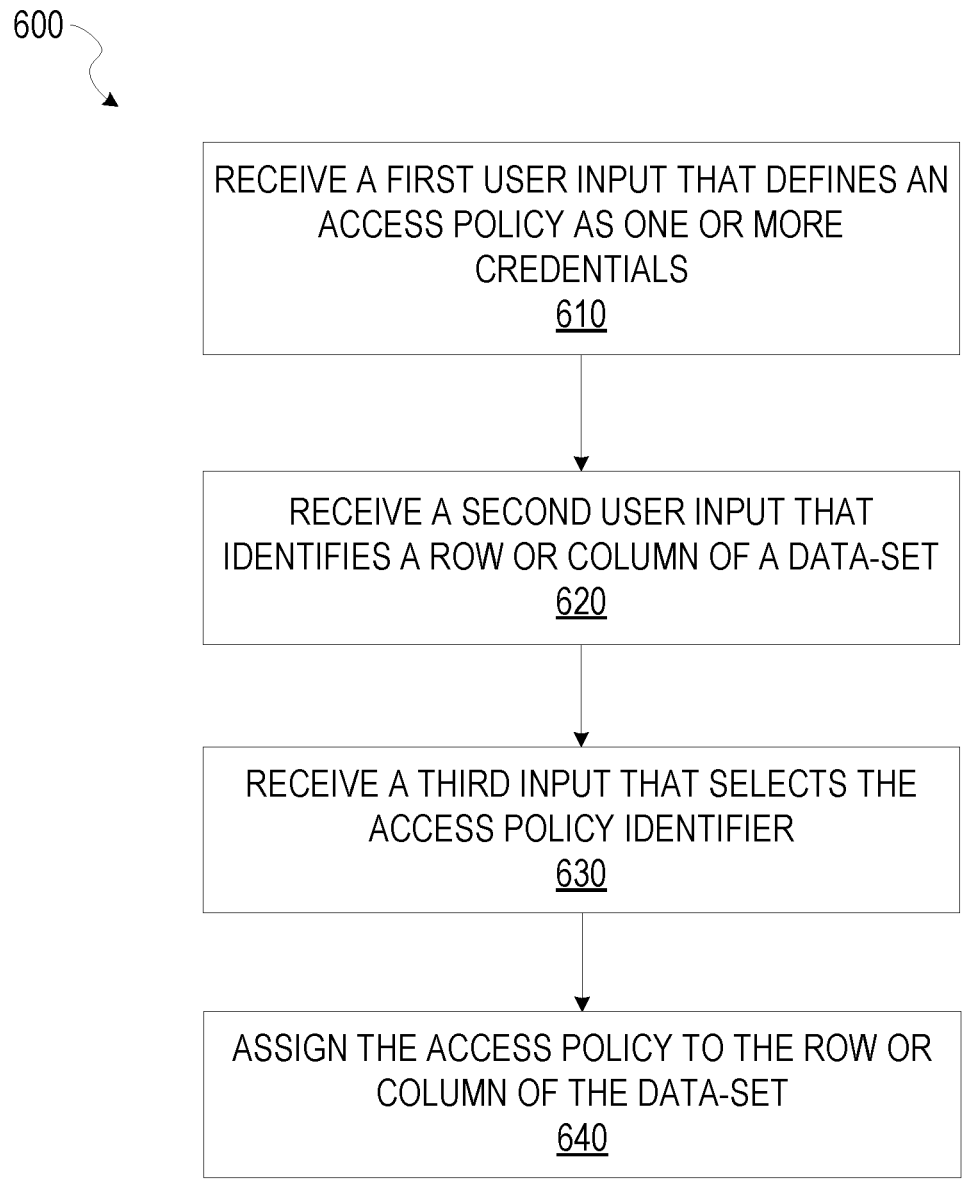
FIG. 6 is a flowchart illustrating a method for assigning an access policy to a cell of a data-set, according to some example embodiments.

FIG. 6 is a flowchart illustrating a method 600 for assigning an access policy to a row or column of a data-set, according to some example embodiments. One or more operations of the method 600 may be performed as part (e.g., a precursor task, a subroutine, or a portion) of operation 320 of the method 300 of FIG. 3, according to some example embodiments.

At operation 610, the policy module 220 receives a first user input that defines an access policy as one or more user or device credentials. For example, an administrator of the policy service 150 may select one or more credentials (e.g., user attributes, device attributes, location criteria, temporal criteria, etc.), and assign the one or more credentials to an access policy identifier. In further embodiments, the policy service 150 may be automated such that credentials are selected based on a set of rules and configurations received from the administrator. For example, the administrator may correlate one or more credentials to one or more attributes (e.g., Credential 1 correlates with User Attribute 1).

At operation 620, the policy module 220 receives a second user input that identifies a row or column of a data-set. In some embodiments, in response to receiving the second user input that identifies the row or column of the data-set, the communication module 230 causes display of a set of access policy identifiers that the administrator may select in order to assign to the row or column of the data-set. For example, the communication module 230 may generate and cause display of a GUI, wherein the GUI includes a drop down menu that displays a set of access policy identifiers. A user may select an access policy identifier from among the set of access policy identifiers, and in response the policy module 220 may retrieve and present the corresponding credentials associated with the selected access policy.

At operation 630, the policy module 220 receives a third user input that selects an access policy identifier that identifies an access policy from among the set of access policy identifiers. For example, the communication module 230 may generate and cause display of a GUI that includes a presentation of one or more access policy identifiers to be assigned to the row or column of the data-set, in response to receiving a selection of the row or column of the data-set.

In response to receiving the third user input, at operation 640 the policy module 220 assigns the access policy identified by the access policy identifier to the row or column of the data-set. By assigning the access policy to the row or column of the data-set, all cells that intersect with the row or column of the data-set receive the access policy such that the contents of the row or column may only be accessed by a user with the necessary credentials, as defined by the access policy may receive access to the data within the cell of the data-set.

Figure 7:
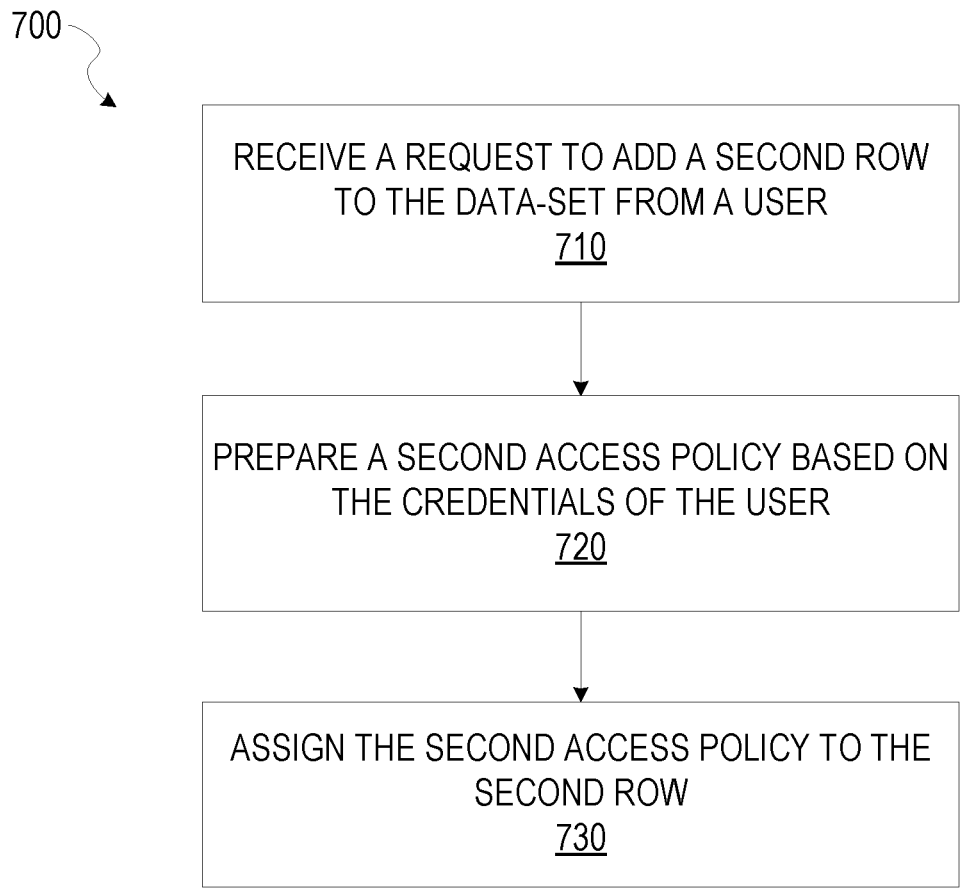
FIG. 7 is a flowchart illustrating a method for assigning an access policy to a cell of a data-set, according to some example embodiments.

FIG. 7 is a flowchart illustrating a method 700 for assigning an access policy to a cell of a data-set, according to some example embodiments. One or more operations of the method 700 may be performed as part (e.g., a precursor task, a subroutine, or a portion) of operation 320 of the method 300 of FIG. 3, according to some example embodiments.

At operation 710, the data module 210 receives a request to add a new row (or column) to a data-set from a user 106 via a client device 110. For example, the request may comprise an identification of the data-set and a row that comprises a set of data to be added to the data-set.

At operation 720, in response to receiving the request to add the new row to the data-set from the user 106 via the client device 110, the policy module 220 prepares an access policy (e.g., a second access policy) to assign to the new row, wherein the access policy is defined as one or more credentials of the user 106.

In some embodiments, the policy module 220 generates the access policy to be assigned to the new row based on the credentials of the user 106. For example, in response to receiving the request to add the new row to the data-set from the user 106, the policy module 220 retrieves the credentials of the user 106 from a memory location associated with a user account of the user 106, wherein the user account includes an identification of the credentials of the user 106.

In further embodiments, in response to receiving the request to add the row to the data-set from the user 106 of the client device 110, the communication module 230 presents a notification to an administrator associated with the data-set, wherein the notification includes a request for an access policy to be assigned to the new row. The administrator of the data-set provides inputs that identify one or more access policies to be assigned to the new row, by either selecting an access policy identifier from among a set of access policy identifiers, or by defining a new access policy through the selection of one or more credentials.

Figure 8:
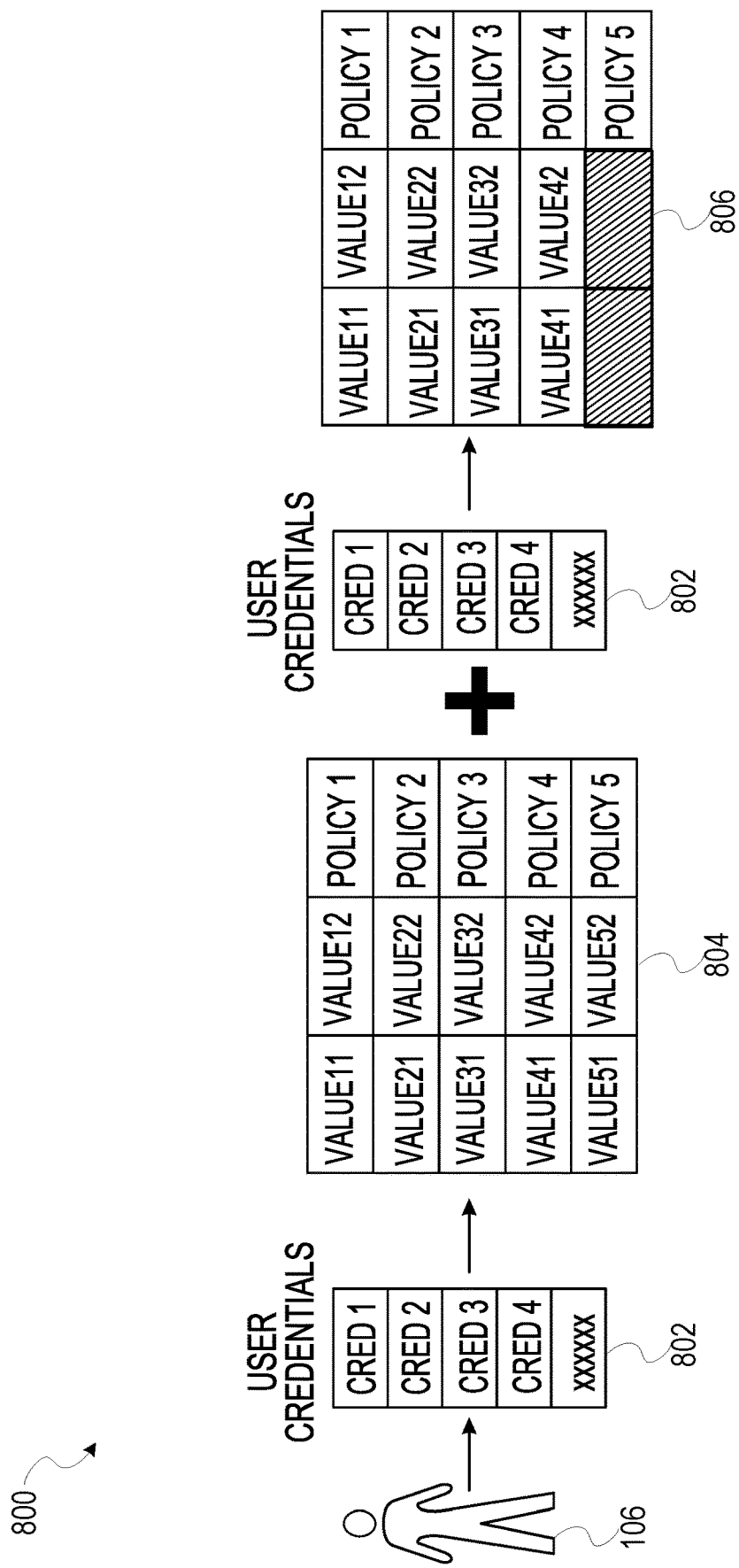
FIG. 8 is a flow diagram illustrating a method for filtering a data-set based on credentials of a user associated with a client device, consistent with some embodiments.

FIG. 8 is a flow diagram 800 illustrating a method for filtering a data-set based on a credentials of a user 106, consistent with some embodiments, and as discussed in the method 400 of FIG. 4.

As shown in FIG. 8, the user credentials 802 are generated based on one or more user credentials associated with the user 106 and the client device 110. For example, as discussed in operation 410 of the method 400, the data module 210 generates the user credentials 802 based on the credentials associated with the user 106 and the client device 110 in response to receiving a request to access a data-set 804, or in some embodiments in response to detecting a new credential being added to a user profile of the user 106. The credentials may include user attributes, device attributes, as well as location attributes.

As seen in the flow diagram 800, the data-set 804 is filtered based on the user credentials 802 to generate a filtered data-set 806, as discussed in operation 440 of the method 400. For example, each row or column of the data-set 804 may be assigned an access policy that comprises a set of required credentials to gain access to read or write to the corresponding row or column of the data-set 804. The policy service 150 filters the data-set 804 based on the user credentials 802 and the access policies of the rows and columns of the data-set 804. In some embodiments, one or more cells of a presentation of the filtered data-set 806 may be redacted or censored to remove sensitive or unavailable information.

Figure 9:
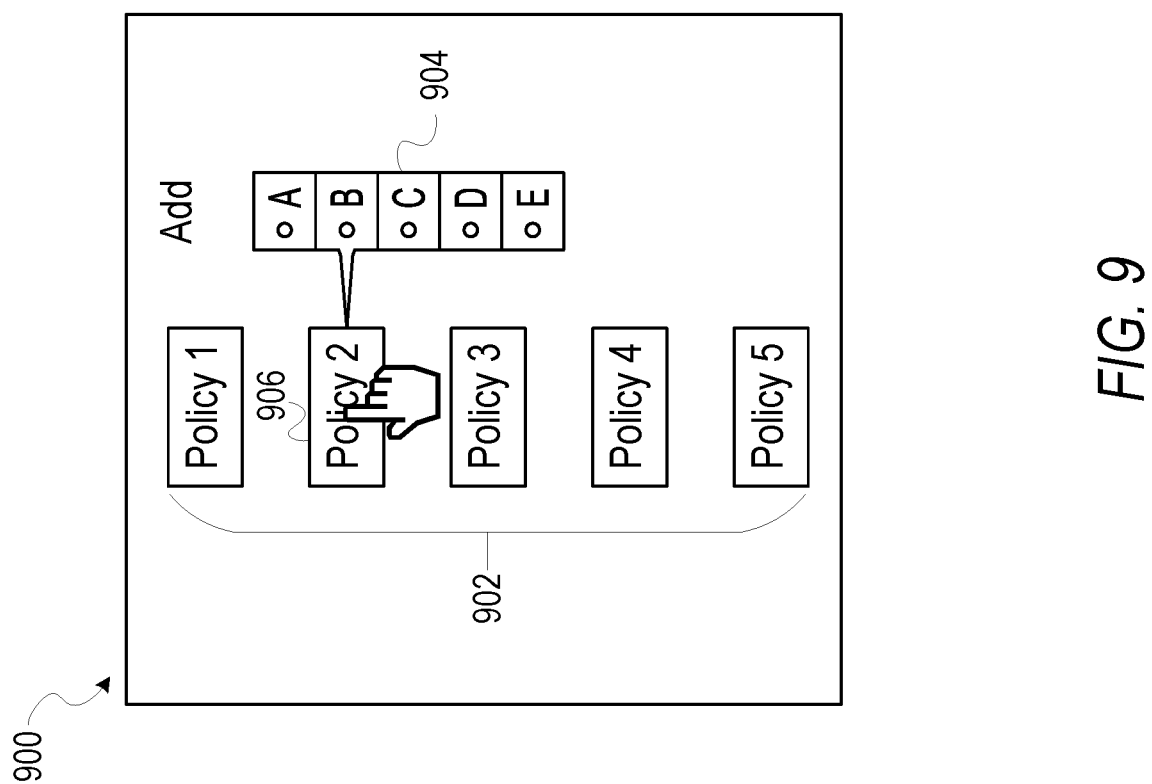
FIG. 9 is an interface diagram illustrating a portion of a graphical user interface for assigning one or more credentials to a policy identifier, consistent with some embodiments.

FIG. 9 is an interface diagram illustrating a portion of a GUI 900 for assigning a policy identifier to a row or column of a data-set, according to certain example embodiments, and as discussed in the operation 610 of the method 600. As seen in FIG. 9, the GUI 900 comprises a presentation of a set of interface element for configuring one or more access policies 902 based on one or more selections of credentials 904. For example, a user may select a policy identifier (e.g., policy identifier 906), and in response, the communication module 230 generates and causes display of a menu comprising the credentials 904. A user may provide inputs selecting one or more of the credentials 904, and in response, the policy module 220 assigns the selected credentials to the access policy identified by the policy identifier 906.

Figure 10:
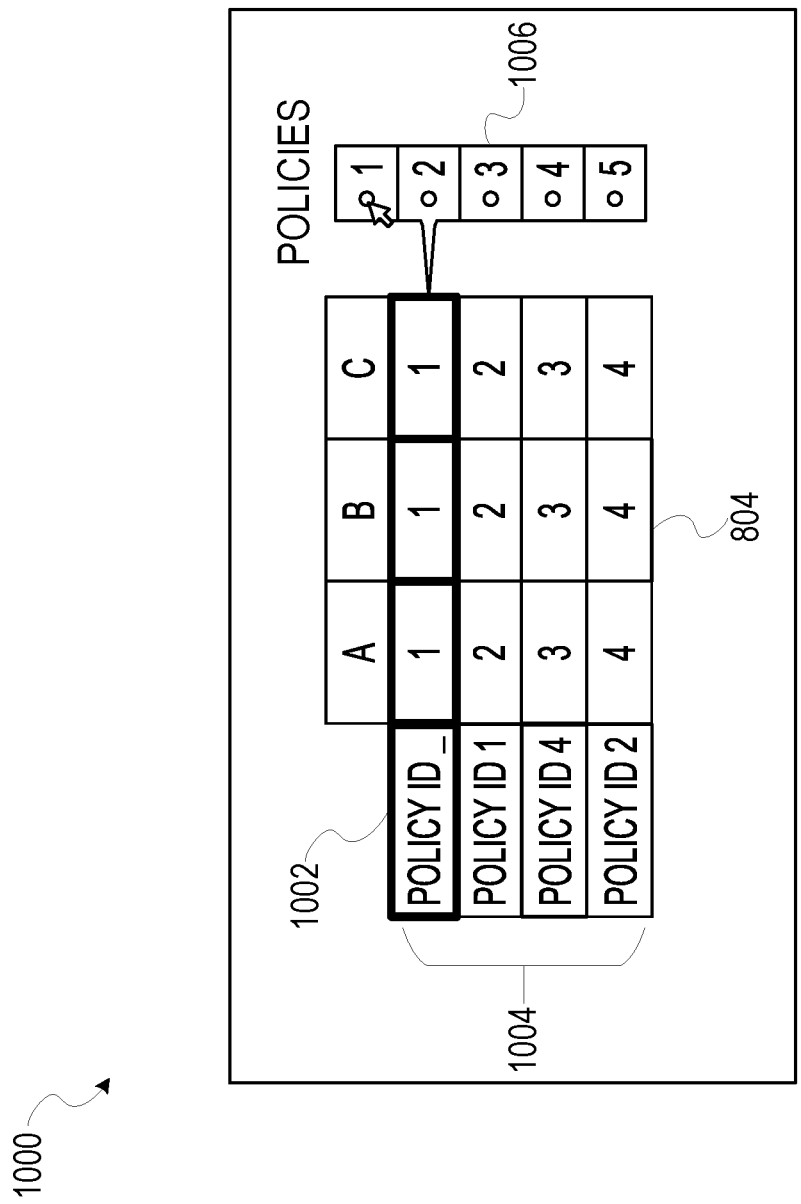
FIG. 10 is an interface diagram illustrating a portion of a graphical user interface for assigning a policy identifier to a row of a data-set, consistent with some embodiments.

FIG. 10 is an interface diagram illustrating a portion of a GUI 1000 for assigning one or more credentials to a policy identifier, consistent with some embodiments, and as discussed in operation 630 of the method 600. The GUI 1000 is shown as including a presentation of the data-set 804 (as in FIG. 8) that includes a display of a set of policy identifiers 1004 of access policies that are assigned to the rows of the data-set 804.

For example, as described in the operation 630 of the method 600, the policy module 220 receives a user input that selects an access policy identifier from among a selection of access policy identifiers 1006, and in response, the policy module 220 assigns the selected access policy identified by the access policy identifier to the row of the data-set (e.g., row 1002). Thus, by assigning the access policy to the row of the data-set, all cells that intersect with the row of the data-set are also assigned the access policy such that only users with the credentials defined by the access policy may receive access to the data within the cell of the data-set.

Figure 11:
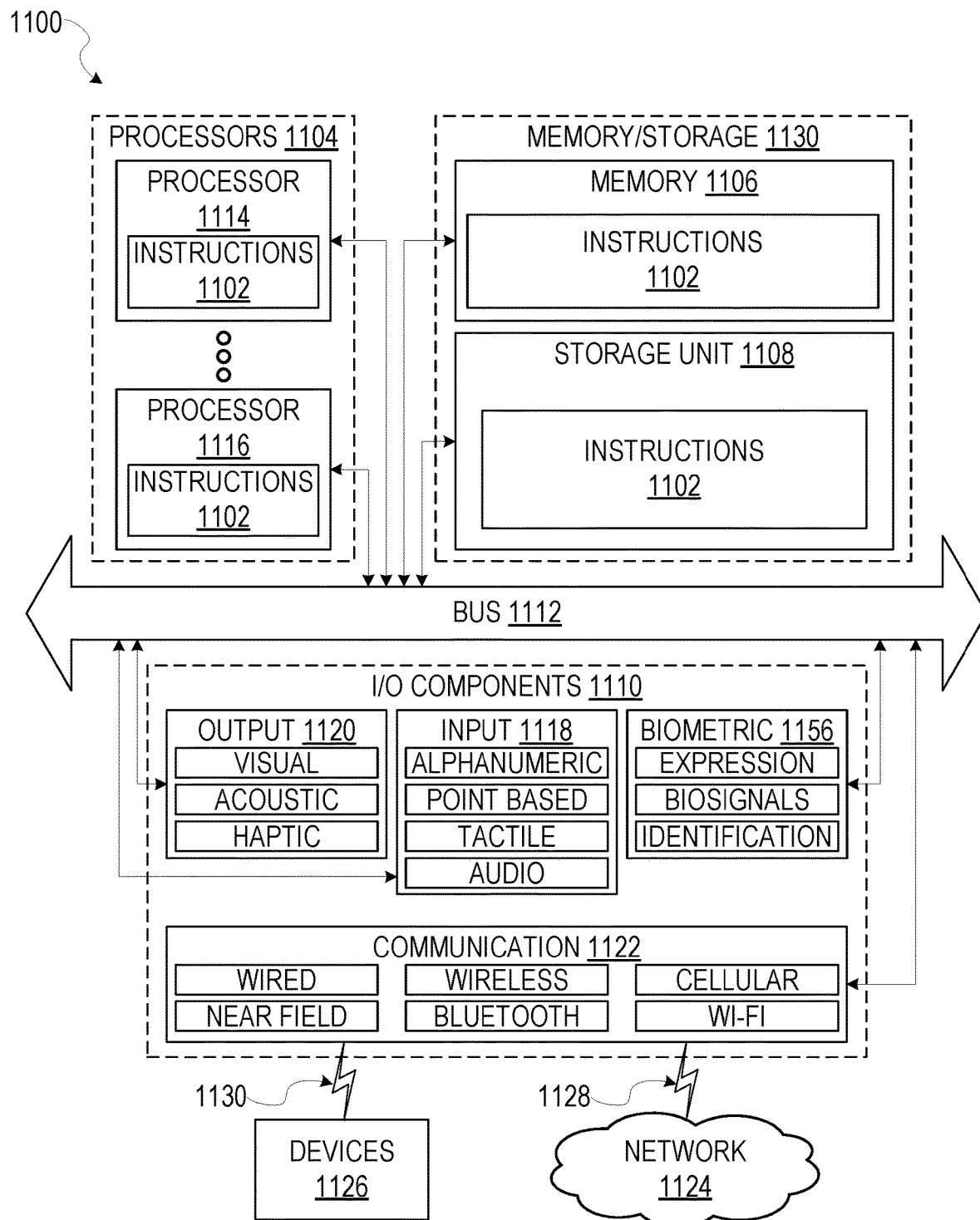
FIG. 11 is a diagrammatic representation of a machine in the example form of a computer system within which a set of instructions for causing the machine to perform any one or more of the methodologies discussed herein may be executed.

FIG. 11 is a diagrammatic representation of a machine 1100 in the example form of a computer system within which a set of instructions for causing the machine to perform any one or more of the methodologies discussed herein may be executed. Specifically, FIG. 11 shows a diagrammatic representation of the machine 1100 in the example form of a system, within which instructions 1102 (e.g., software, a program, an application, an applet, an app, a driver, or other executable code) for causing the machine 1100 to perform any one or more of the methodologies discussed herein may be executed. For example, the instructions 1102 include executable code that causes the machine 1100 to execute the methods 300, 400, 500, 600 and 700. In this way, these instructions 1102 transform the general, non-programmed machine into a particular machine programmed to carry out the described and illustrated functions in the manner described herein. The machine 1100 may operate as a standalone device or may be coupled (e.g., networked) to other machines.

By way of non-limiting example, the machine 1100 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1102, sequentially or otherwise, that specify actions to be taken by machine 1100. Further, while only a single machine 1100 is illustrated, the term "machine" shall also be taken to include a collection of machines 1100 that individually or jointly execute the instructions 1102 to perform any one or more of the methodologies discussed herein.

The machine 1100 may include processors 1104, memory 1106, storage unit 1108 and I/O components 1110, which may be configured to communicate with each other such as via a bus 1112. In an example embodiment, the processors 1104 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1114 and processor 1116 that may execute instructions 1102. The term "processor" is intended to include multi-core processors that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory 1106 (e.g., a main memory or other memory storage) and the storage unit 1108 are both accessible to the processors 1104 such as via the bus 1112. The memory 1106 and the storage unit 1108 store the instructions 1102 embodying any one or more of the methodologies or functions described herein. In some embodiments, the databases 126 resides on the storage unit 1108. The instructions 1102 may also reside, completely or partially, within the memory 1106, within the storage unit 1108, within at least one of the processors 1104 (e.g., within the processor's cache memory), or any suitable combination thereof, during execution thereof by the machine 1100. Accordingly, the memory 1106, the storage unit 1108, and the memory of processors 1104 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 1102. The term "machine-readable medium" shall also be taken to include any medium, or combination of multiple media, that is capable of storing instructions (e.g., instructions 1102) for execution by a machine (e.g., machine 1100), such that the instructions, when executed by one or more processors of the machine 1100 (e.g., processors 1104), cause the machine 1100 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1110 may include a wide variety of components to receive input, provide output, produce output, transmit information, exchange information, capture measurements, and so on. The specific I/O components 1110 that are included in a particular machine will depend on the type of machine. For example, portable machines such as mobile phones will likely include a touch input device or other such input mechanisms, while a headless server machine will likely not include such a touch input device. It will be appreciated that the I/O components 1110 may include many other components that are not specifically shown in FIG. 11. The I/O components 1110 are grouped according to functionality merely for simplifying the following discussion and the grouping is in no way limiting. In various example embodiments, the I/O components 1110 may include input components 1118, biometric components 1156, and output components 1120. The input components 1118 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 1120 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The biometric components 1156 may include, but are not limited to fingerprint, palm veins, face recognition, DNA, palm print, hand geometry, iris recognition, retina and odour/scent. Behavioral characteristics are related to the pattern of behavior of a person, including but not limited to typing rhythm, gait, and voice.

Communication may be implemented using a wide variety of technologies. The I/O components 1110 may include communication components 1122 operable to couple the machine 1100 to a network 1124 or devices 1126 via coupling 1128 and coupling 1130, respectively. For example, the communication components 1122 may include a network interface component or other suitable device to interface with the network 1124. In further examples, communication components 1122 may include wired communication components, wireless communication components, cellular communication components, near field communication (NFC) components, Bluetooth® components (e.g., Bluetooth® Low Energy), WiFi® components, and other communication components to provide communication via other modalities. The devices 1126 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
accessing a data-set that comprises a column and a row that intersect at a cell, the cell comprising content;
receiving an input that selects an access policy identifier from among a set of access policy identifiers, the access policy identifier corresponding with a predefined access policy that defines a set of credentials;
assigning the predefined access policy that corresponds with the access policy identifier to the row of the data-set;
receiving a request to access the data-set from a client device associated with a user account;
filtering the content from the cell based on a credential associated with the user account and the predefined access policy assigned to the row; and
causing display of a presentation of at least a portion of the data-set at the client device, the presentation of the data-set including a display of the cell, the display of the cell including an indication having indication content indicating that data has been filtered from the content, the indication content including content more than a blank.

2. The method of claim 1, wherein the receiving the request to access the data-set further comprises:
maintaining the credential of the user account at a memory location;
associating the memory location with an identifier of the user account; and
accessing the credential associated with the user account at the memory location responsive to the request.

3. The method of claim 1, wherein the receiving the input that selects the access policy identifier from among the set of access policy identifiers further comprises:
causing display of a menu element at a position within a GUI based on the accessing the data-set, the menu element comprising a display of a set of access policy identifiers that include the access policy identifier; and
wherein the input selects the access policy identifier from among the set of access policy identifiers within the menu element.

4. The method of claim 1, wherein the receiving the input that selects the access policy identifier from among the set of access policy identifiers further comprises:
receiving a selection of the row of the data-set;
causing display of a menu element at a position within a GUI responsive to the selection of the row, the menu element comprising a display of a set of access policy identifiers that include the access policy identifier; and
wherein the input selects the access policy identifier from among the set of access policy identifiers within the menu element.

5. The method of claim 1, wherein the predefined access policy defines read and write permissions associated with the row of the data-set.

6. The method of claim 1, wherein the assigning the predefined access policy to the row of the data-set further comprises:
receiving a first user input that defines the credentials of the predefined access policy;
receiving a second user input that identifies the row of the data-set; and
assigning the predefined access policy to the cell that intersects with the row of the data-set.

7. A system comprising:
a memory; and
at least one hardware processor coupled to the memory and comprising instructions that causes the system to perform operations comprising:
accessing a data-set that comprises a column and a row that intersect at a cell, the cell comprising content;

receiving an input that selects an access policy identifier from among a set of access policy identifiers, the access policy identifier corresponding with a predefined access policy that defines a set of credentials;

assigning the predefined access policy that corresponds with the access policy identifier to the row of the data-set;

receiving a request to access the data-set from a client device associated with a user account;

filtering the content from the cell based on a credential associated with the user account and the predefined access policy assigned to the row; and causing display of a presentation of at least a portion of the data-set at the client device, the presentation of the data-set including a display of the cell, the display of the cell including an indication having indication content indicating that data has been filtered from the content, the indication content including content more than a blank.

8. The system of claim 7, wherein the receiving the request to access the data-set further comprises:
maintaining the credential of the user account at a memory location;
associating the memory location with an identifier of the user account; and
accessing the credential associated with the user account at the memory location responsive to the request.

9. The system of claim 7, wherein the receiving the input that selects the access policy identifier from among the set of access policy identifiers further comprises:
causing display of a menu element at a position within a GUI based on the accessing the data-set, the menu element comprising a display of a set of access policy identifiers that include the access policy identifier; and
wherein the input selects the access policy identifier from among the set of access policy identifiers within the menu element.

10. The system of claim 7, wherein the receiving the input that selects the access policy identifier from among the set of access policy identifiers further comprises:
receiving a selection of the row of the data-set;
causing display of a menu element at a position within a GUI responsive to the selection of the row, the menu element comprising a display of a set of access policy identifiers that include the access policy identifier; and
wherein the input selects the access policy identifier from among the set of access policy identifiers within the menu element.

11. The system of claim 7, wherein the access policy defines read and write permissions associated with the row of the data-set.

12. The system of claim 7, wherein the predefined assigning the access policy to the row of the data-set further comprises:
receiving a first user input that defines the credentials of the predefined access policy;
receiving a second user input that identifies the row of the data-set; and
assigning the predefined access policy to the cell that intersects with the row of the data-set.

13. A non-transitory machine-readable storage medium comprising instructions that, when executed by one or more processors of a machine, cause the machine to perform operations comprising:
accessing a data-set that comprises a column and a row that intersect at a cell, the cell comprising content;
receiving an input that selects an access policy identifier from among a set of access policy identifiers, the access policy identifier corresponding with a predefined access policy that defines a set of credentials;
assigning the predefined access policy that corresponds with the access policy identifier to the row of the data-set;
receiving a request to access the data-set from a client device associated with a user account;
filtering the content from the cell based on a credential associated with the user account and the predefined access policy assigned to the row; and
causing display of a presentation of at least a portion of the data-set at the client device, the presentation of the data-set including a display of the cell, the display of the cell including an indication having indication content indicating that data has been filtered from the content, the indication content including content more than a blank.

14. The non-transitory machine-readable storage medium of claim 13, wherein the receiving the request to access the data-set further comprises:
maintaining the credential of the user account at a memory location;
associating the memory location with an identifier of the user account; and
accessing the credential associated with the user account at the memory location responsive to the request.

15. The non-transitory machine-readable storage medium of claim 13, wherein the receiving the input that selects the access policy identifier from among the set of access policy identifiers further comprises:
causing display of a menu element at a position within a GUI based on the accessing the data-set, the menu element comprising a display of a set of access policy identifiers that include the access policy identifier; and
wherein the input selects the access policy identifier from among the set of access policy identifiers within the menu element.

16. The non-transitory machine-readable storage medium of claim 13, wherein the receiving the input that selects the access policy identifier from among the set of access policy identifiers further comprises:
receiving a selection of the row of the data-set;
causing display of a menu element at a position within a GUI responsive to the selection of the row, the menu element comprising a display of a set of access policy identifiers that include the access policy identifier; and
wherein the input selects the access policy identifier from among the set of access policy identifiers within the menu element.

17. The non-transitory machine-readable storage medium of claim 13, wherein the predefined access policy defines read and write permissions associated with the row of the data-set.

* * * * *